H. P. FISHER.
SHEAF LOADER.
APPLICATION FILED MAY 1, 1916.

1,214,290.

Patented Jan. 30, 1917.
3 SHEETS—SHEET 1.

Inventor
Harry P. Fisher
By Cheever & Cox
Attys.

H. P. FISHER.
SHEAF LOADER.
APPLICATION FILED MAY 1, 1916.

1,214,290.

Patented Jan. 30, 1917.
3 SHEETS—SHEET 2.

Inventor:
Harry P. Fisher.
By Cheever & Cox
Attys

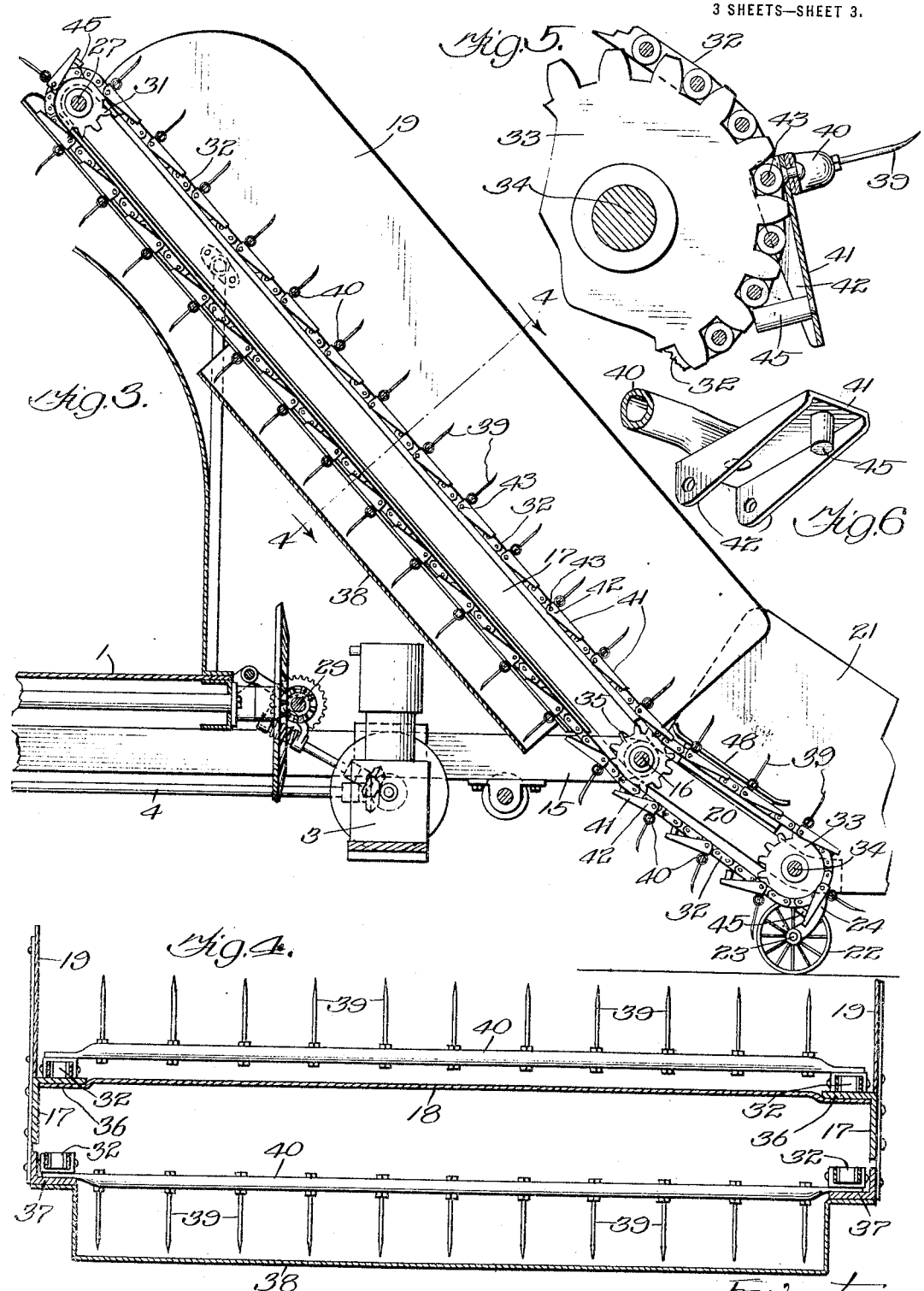

UNITED STATES PATENT OFFICE.

HARRY P. FISHER, OF CHICAGO, ILLINOIS.

SHEAF-LOADER.

1,214,290.

Specification of Letters Patent.  Patented Jan. 30, 1917.

Application filed May 1, 1916. Serial No. 94,607.

*To all whom it may concern:*

Be it known that I, HARRY P. FISHER, a citizen of the United States, residing at Chicago, in the county of Cook and State of Illinois, have invented a certain new and useful Improvement in Sheaf-Loaders, of which the following is a specification.

My invention relates to machines, primarily for loading sheaves of grain into a wagon or other vehicle. In the form selected to illustrate the invention, the apparatus is mounted at the forward end of a motor driven vehicle of a type suitable to be propelled through the fields after the grain has been bundled into sheaves and rests upon the ground either singly or in shocks. In its general aspect, my machine is designed to approach the shock and automatically load the sheaves into the vehicle, to be thereafter transported to the thresher or to a place of temporary storage.

In carrying out my invention, I provide a conveyer mounted at the front end of the vehicle and having a foot section articulately connected at its lower end, the purpose being to permit the conveyer to accommodate itself to the undulations of the ground, or to be raised and held clear of the ground when the machine is traveling from place to place.

One object of the invention is to provide a conveyer having this characteristic.

Another object is to provide means for enabling the conveyer teeth to stand rigidly to their work especially when picking up the sheaves from the ground or shock.

Another object is to provide a construction such that when the sheaves reach the top of the conveyer they will receive a special impulse and be propelled with comparatively sudden force toward the back of the vehicle thus obtaining better distribution of the load.

Another object is to provide a construction whereby the vehicle itself may be turned from side to side in the field to steer it toward the various sheaves or shocks and at the same time have the lower end of the conveyer swing freely from side to side and not impede or hamper the movements of the vehicle.

It is my purpose also to provide a light and simple construction and one that shall be durable and relatively cheap to manufacture.

Other detailed objects will become apparent as the description proceeds.

I accomplish my objects by the mechanism illustrated in the accompanying drawings, in which—

Figure 1:
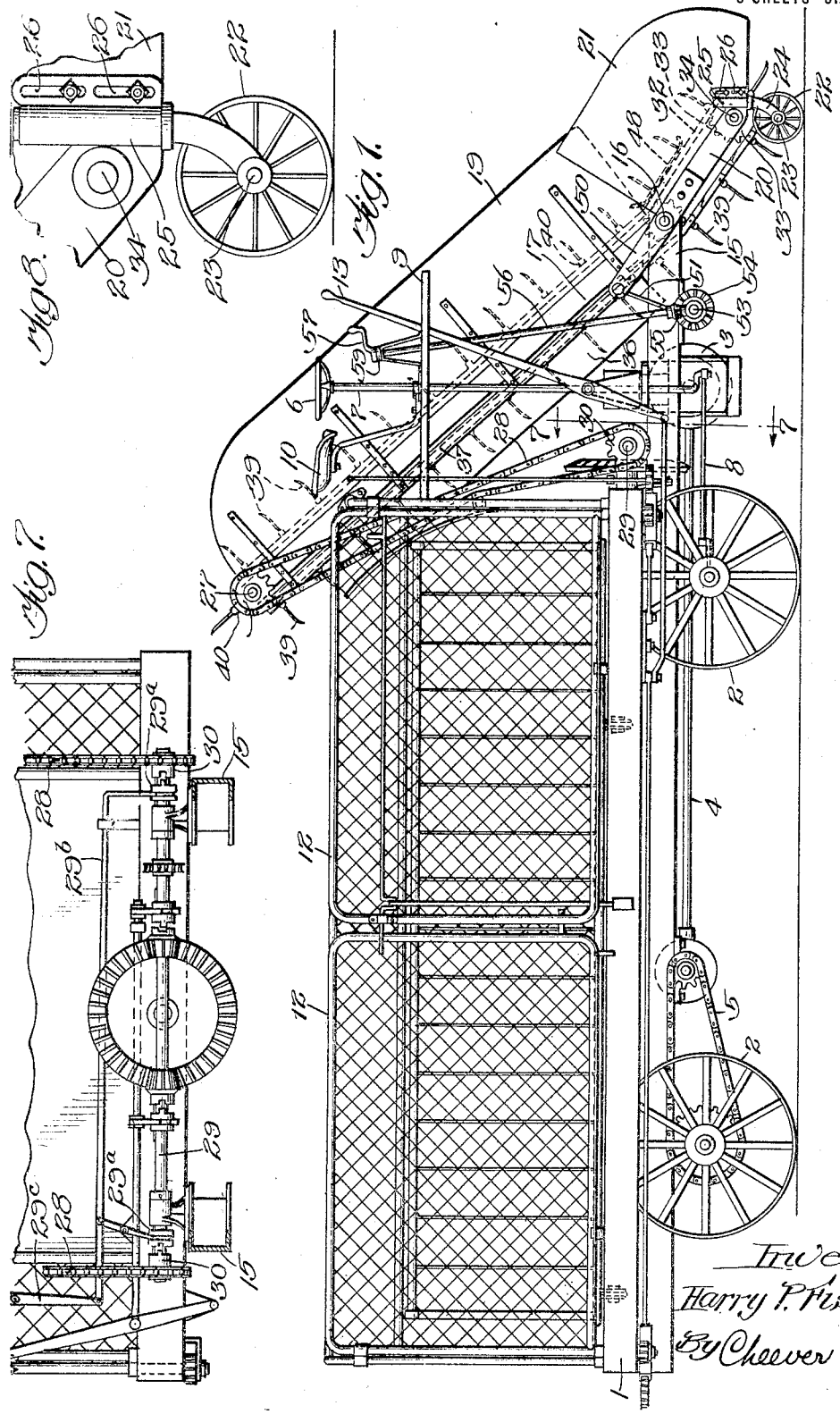
Figure 2:
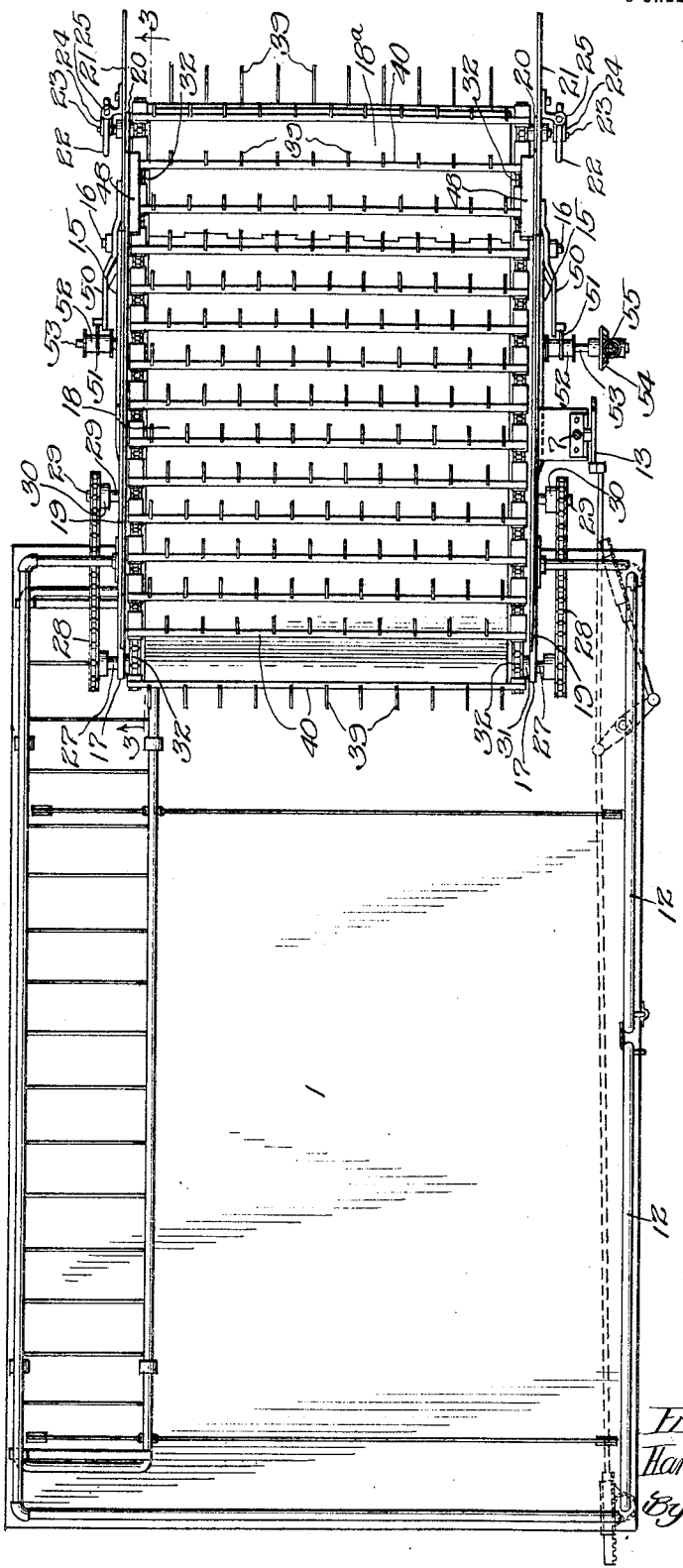

Figure 1 is a side elevation of the complete machine. Fig. 2 is a plan view thereof. Fig. 3 is a section on the line 3—3, Fig. 2. Fig. 4 is a section cross-wise of the conveyer on the line 4—4, Fig. 3. Fig. 5 is a detail showing the construction of the conveyer teeth and of the method of supporting and operating the same. Fig. 6 is a perspective view of the supporting arm at the end of the cross bar which carries the conveyer teeth. Fig. 7 is a sectional detail on the line 7—7, Fig. 1. Fig. 8 is a side view in detail of one of the wheels for supporting the forward end of the foot section of the conveyer.

Similar numerals refer to similar parts throughout the several views.

The present drawings show certain parts which form the subject of a companion application filed on the first day of May, 1916, Serial Number 94,608.

In the form selected to illustrate the invention, the vehicle itself consists of a wagon having a body 1, supported upon suitable running gear 2. It is driven by any suitable type of motor or power device 3, connected by a drive shaft 4 to the driving chains 5. The vehicle is steered through the agency of a wheel 6 secured to the steering post 7, said post being connected to the front wheels through the steering rod 8. A platform 9 is located in any convenient position near the front of the machine and provided with a seat 10 for the driver. The gates 12, 12 are controlled by the driver through the medium of the lever 13, which is suitably connected to the gates, but need not be here described as the parts have no intimate relation with the essential features of the present invention.

A pair of sills 15 extends out in front of the wagon body and at the forward end supports a horizontal shaft 16. A pair of beams 17 extends obliquely upward and backward from the forward end of the sills 15 and forms the main framework of the conveyer. A floor 18 is supported upon these beams and two side pieces 19 are located at the edges for holding the sheaves within the conveyer. The beams, floor and sides are stationary and at the upper end terminate at the front end of the vehicle body. Extending downward and forward from the front end of the sills 15 are two parallel bars 20 which are pivoted at their upper rear ends upon the shaft 16. These form articulated extensions of the beams 17 and with the side pieces 21 constitute a pivoted foot section of the conveyer chute. The floor 18ª of the foot section is, by preference, pivoted directly to the lower end of the floor 18 of the stationary section of the conveyer chute, and is slidable upon the bars 20. This permits freedom of movement of the foot section and always insures tight connection between the two floor sections at their proximate ends. The lower end of the foot section is supported upon wheels 22 whose axles 23 are located at the lower end of arms 24 journaled in brackets 25 fastened to the lower end of the foot section as best shown in Figs. 1 and 8. The arms 24 swing about approximately vertical axes and are bent after the manner of casters so they enable the wheels always to trail a little behind said vertical axes and enable them to assume the direction in which the machine is traveling. Thus the machine may be steered to the right or left and said wheels will accommodate themselves to the variations in direction of travel. As a result of this general construction the front end of the pivoted foot section of the conveyer always follows the undulations of the ground.

The wheels 22 are vertically adjustable with reference to the foot section. The purpose is to enable the lower end of the floor section to be held at different heights above the surface of the ground; for in stony fields, the conveyer teeth cannot, with safety, come so close to the ground as in fields free from stones. A suitable means of adjustment is shown in detail in Fig. 8 in which it will be seen that the brackets 25 have elongated bolt holes 26 through which they may be fastened to the sides of the foot section of the conveyer.

A horizontal cross shaft 27 is mounted at the top of the conveyer and is driven by chains 28, 28 which are in turn driven by sprockets 30 loosely mounted on a horizontal cross shaft 29 near the floor of the vehicle. Shaft 29 is connected in any suitable manner to the gasolene engine or other motor 3 previously mentioned. Clutch collars 29ª are splined on shaft 29 and are shifted into and out of engagement with the hubs of the sprockets 30 by a shifting rod 29ᵇ operated by a shifting lever 29ᶜ, as best shown in Fig. 7. Rigidly fastened to the shaft 27 are two sprockets 31, 31 which drive the link belts or chains 32. At the lower end these chains pass around idler sprockets 33, 33 mounted upon a horizontal cross shaft 34 supported at the lower forward end of the bars 20.

Idler sprockets 35 are mounted upon the shaft 16 for supporting and guiding the chains 32 at the point where the conveyer chute or body is articulated. The conveyer chains are arranged at the two sides of the chute and by preference slide upon the upper surface of the beams 17 instead of upon the floor sheet 18. This construction is best shown in Fig. 4, where it will be seen that at the edges 36 the floor sheet is countersunk to fit under the inwardly extending legs of the beams and bring the upper surface of the beams flush with the upper surface of the floor sheet. This makes a substantial track for supporting the chains in their upward travel. On their downward travel the chains are supported upon a second pair of beams 37 arranged beneath the beams 17 as best shown in Fig. 4. Beams 37 also support a stationary shield 38 through which the conveyer teeth 39 travel on their downward journey.

The conveyer teeth are rigidly attached to cross bars 40 which are formed preferably of tubing flattened at the end as best shown in Figs. 4 and 5. Rigidly fastened to each end of each bar is an arm 41 shown in section in Fig. 5 and in perspective in Fig. 6. These arms have parallel side wings 42 which are pivotally supported upon the projecting ends of pins 43 (see Fig. 5.) These pins are like the other pins which form the means for articulately connecting the links together, except that they are extended sufficiently to pass through the said wings 42 and thus pivotally connect the arms 41 to the chain. At the rear end each arm 41 has a post 45 so constructed that when the conveyer teeth are at the beginning of their upward travel, the end of the post will rest upon one of the teeth of the sprocket 33. At this point in the movement of the teeth, they will be picking up the sheaves and possibly removing one or more of them from the shock and consequently will be under maximum strain. By thus bracing the teeth as I have done, they will stand to their work with great rigidity; in fact, the arm 41 forms a lever fulcrumed upon the pin 43 for overcoming the tendency of the teeth to yield when they are picking up their load. After the arms 41 have left the lower sprocket 33 the posts 45, (as the parts are usually constructed) pass through the usual spaces in the link belting or chains and thus let the flat surface of the arm bear upon the chain.

Shoes 48 are rigidly fastened a slight distance above each of the bars 20, parallel thereto, for holding the conveyer chains down close to the floor of the foot section of the conveyer. These shoes are omitted from Fig. 2 in order to better show the position and construction of the chains, but they are shown in Fig. 3 and in dotted lines in Fig. 1. These are upwardly curved at the ends to avoid any danger of having the chains catch in them.

I have provided means for raising the foot section of the conveyer out of contact with the ground when the machine is traveling from place to place, or when the vehicle is filled and is on its way to deposit its load. According to the design shown, arms 50 are fastened to each of the bars 20, these arms extending upward and rearward from the fulcrum shaft 16. A cable 51 (see Figs. 1 and 2) leads from the rear end of each of these arms to a drum 52 rigidly fastened to a shaft 53, which extends horizontally across the machine and is supported from the sills 15. Said shaft is rotated by a bevel gear 54 which meshes with a pinion 55 fastened at the lower end of a rod 56. The upper end of the rod leads to the operator's platform 9 and is provided with a hand lever 57 within convenient reach of the operator. This lever has a hub 59, see Fig. 1. By rotating rod 56 in the proper direction to wind up the cables 51, the rear end of the arms 50 will be lowered and the forward end of the bars 20 will be raised. This lifts the wheels 22 clear of the ground.

In operation, when the machine is traveling along the road, the operator will wind in the cables 51 and hold the foot section of the conveyer clear of the ground. When the field where the sheaves are standing is reached, the operator unwinds the drums so that the cables will have considerable slack. The wheels 22 will now rest upon the ground and hold the points of the conveyer teeth a few inches above the ground when the latter are at the lowest point in their travel. The points of the teeth will maintain a constant distance from the surface of the ground due to the action of the wheels 22 which follow the undulations of the surface of the field. At about the time when the teeth are first engaging the sheaves, the posts 45 on the arms 41 rest upon the teeth upon the sprocket wheels 35 as shown in Fig. 5 and thus effectually prevent the teeth from yielding. As soon as the posts have left the sprockets, the arms 41 will rest flat upon the chains, the posts passing down between the spaces in the chains. This gives the arms a firm bearing and serves to brace the conveyer teeth. The shoes 48 overlie the chains while the latter are traveling along the foot section and thus hold the chains down upon bars 20 regardless of the angular position thereof about the shaft 16. As a result of my construction in this particular, not only is the conveyer chute or frame articulated, but the conveyer as a whole is articulated for the chains and parts attached thereto always follow closely the angle of the parts which they are passing over at the moment. When the teeth reach the top of the conveyer, a peculiar action takes place in that a rather sudden impulse is imparted to the teeth. It will be remembered that the teeth and their arms 41 are freely pivoted upon the pins 43; hence, they are free at any time to rotate in a forward direction about said pins. When any given pin reaches the top of the upper sprocket 31, it immediately and rather suddenly changes its direction in following around the periphery of the sprocket. For a moment, the trailing arms remain in contact with the chains, but as soon as the pivot pins change their direction a tendency is created to throw the parts (the bars 40 and parts attached thereto) in a forward direction, the arms rising in the manner illustrated. This has the effect of throwing the sheaves toward the back of the vehicle. In consequence it is not necessary to extend the conveyer to the middle of the vehicle, as would otherwise be necessary in order to effect a minimum personal handling of the sheaves.

The beams 20, it will be noted, are pivoted individually to the lower end of the stationary section of the conveyer chute. They are also supported individually at their lower ends by separate wheels 22, and are slightly loose on the shafts 16 and 34. On this account and because the floor 18$^a$ is loosely supported on the bars 20 and is of comparatively light gage metal and therefore slightly flexible, the foot section is capable of wracking or warping to a limited extent so that the two sides of the foot section may independently follow the contour of the ground.

Having thus described my invention, what I claim as new and desire to secure by Letters Patent, is:—

1. In a sheaf loader, a conveyer chute, a pair of chains traveling along said chute, cross bars extending from one chain to the other, projections upon said cross bars for engaging the sheaves, and arms pivotally attached to said chains and having said cross bars attached to them, said arms overlying and resting upon the chains for a considerable distance behind the forward pivoted end of said arms whereby said arms and teeth are free to swing forward or overthrow at the end of the chute.

2. In a sheaf loader, a conveyer chute, a pair of chains traveling along said chute, cross bars extending from one chain to the other, projections upon said cross bars for engaging the sheaves, and arms pivotally attached at their forward ends to said chains, and extending rearward along said chains for a considerable distance to obtain a firm bearing, said arms having side wings for engaging the sides of the chain to prevent lateral displacement.

3. In a sheaf loader, a conveyer chute, a pair of link belts traveling along said chute, arms resting upon said link belts and having side wings, certain of the pivot pins of the link belt being extended to pivotally engage the wings of said arms, cross bars extending from one link belt to the other and fastened at each end to one of said arms, and conveyer teeth projecting upward from said bars.

4. In a sheaf loader, a conveyer chute, a pair of link belts traveling along said chute, sprockets at the upper and lower ends of said belts, arms pivotally attached at their forward ends to said belts, cross bars fastened to said arms, conveyer teeth projecting from said bars, and posts projecting from said arms for engaging the teeth of the sprockets at the lower end of said belts.

5. In a sheaf loader, a conveyer chute having a stationary section consisting of a stationary frame and a floor laid thereon; and a foot section comprising a floor pivoted to the lower end of the floor of the stationary section, and supporting means pivoted to the lower end of the stationary frame, the floor of the foot section being slidable upon said supporting means to thereby permit freedom of movement of the foot section and at the same time obtain a tight joint between the floors of the two sections.

6. In a sheaf loader, a conveyer chute having a stationary upper section consisting of a stationary frame and a floor fastened thereto; a foot section comprising two side bars pivoted individually to the lower end of the stationary section and provided at their lower ends with separate wheels, whereby their lower ends are independently movable in a vertical direction, and a floor section of comparatively thin gage metal, loosely resting upon the side bars whereby the floor section as a whole may wrack or warp and permit each side to independently follow the contour of the ground.

In witness whereof, I have hereunto subscribed my name.

HARRY P. FISHER.

Copies of this patent may be obtained for five cents each, by addressing the "Commissioner of Patents, Washington, D. C."